(12) United States Patent
Van Dijk

(10) Patent No.: US 6,281,163 B1
(45) Date of Patent: *Aug. 28, 2001

(54) HYDROGENATION CATALYST PARTICLES

(75) Inventor: Gustaaf J. M. Van Dijk, Meeuwiskamp (NL)

(73) Assignee: Engelhard de Meern B.V., De Meern (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/737,076

(22) PCT Filed: May 2, 1995

(86) PCT No.: PCT/US95/05395

§ 371 Date: Apr. 18, 1997

§ 102(e) Date: Apr. 18, 1997

(87) PCT Pub. No.: WO95/30481

PCT Pub. Date: Nov. 16, 1995

(30) Foreign Application Priority Data

May 9, 1994 (EP) .................................................. 94201289

(51) Int. Cl.⁷ ............................. B01J 20/22; B01J 21/08; C07C 5/10; C07C 51/36
(52) U.S. Cl. ....................... 502/401; 502/259; 502/335; 502/337; 585/269; 585/270; 585/276; 426/417; 554/141; 554/146; 554/147; 554/68

(58) Field of Search .................................. 502/401, 259, 502/335, 337; 585/270, 276, 269; 426/417; 554/141, 146, 147, 68

(56) References Cited

U.S. PATENT DOCUMENTS

| 4,263,173 | * | 4/1981 | Carter et al. | 502/245 |
| 4,510,091 | * | 4/1985 | Rosen | 260/409 |
| 5,493,037 | * | 2/1996 | Henderson | 554/147 |
| 5,571,943 | * | 11/1996 | Borninkhof et al. | 564/493 |
| 5,861,521 | * | 1/1999 | Darsow | 554/141 |

FOREIGN PATENT DOCUMENTS

| 2850719 | * | 7/1980 | (DE) | B01J/23/74 |
| 186885 | * | 12/1985 | (EP) | B01J/37/00 |
| 464956 | * | 1/1992 | (EP) | B01J/23/74 |
| 802536 | * | 9/1936 | (FR) | . |
| 1555015 | * | 12/1968 | (FR) | . |
| 1042923 | * | 9/1966 | (GB) | C11C/3/12 |

* cited by examiner

Primary Examiner—Mark L. Bell
Assistant Examiner—Patricia L. Hailey
(74) Attorney, Agent, or Firm—Weingarten, Schurgin, Gagnebin & Hayes LLP

(57) ABSTRACT

The invention is directed to hydrogenation catalyst particles based on nickel or cobalt and a support, incorporated in a matrix of hardened oil or a derivative thereof, which matrix material is solid at a temperature of 25° C., said particles having an average weight of at least 120 mg and an average height of at least 2.8 mm.

12 Claims, No Drawings

HYDROGENATION CATALYST PARTICLES

The present invention relates to catalyst particles based on nickel or cobalt and a support, incorporated in a matrix of hardened oil or a derivative thereof.

Such catalysts are well known, and are employed in particular for the hydrogenation of oils and fats. These triglycerides, often containing polyunsaturated fatty acid chains, are often hydrogenated prior to use, so as to increase stability and/or to adjust the melting behaviour.

Increasing the stability of the polyunsaturated triglycerides is accomplished by hydrogenation of the readily oxidizable polyunsaturated bond. Oxidation of these bonds is undesirable, as this gives rise to a rancid taste.

Adjusting the melting behaviour of the product is particularly important with a view to rendering the product suitable for use in margarines, hard shortening and cocoa butter substitutes.

Another important application of these catalysts is the hydrogenation of fatty nitriles to obtain amines, such as primary, secondary and tertiary amines. Also in the hydrogenation of free fatty acids supported nickel and cobalt catalysts are used.

There are numerous publications dealing with these supported nickel or cobalt catalysts, such as EP-A 92,878, EP-A 167,201, EP-A 168,091, EP-A 168,096, EP-A 340, 848, EP-A 384,542, EP-A 398,446, EP-464,956 and EP-A 566,197.

In commercial practice the supported nickel or cobalt catalysts, when intended to be used in powder form, for example in batch processes, are delivered to the customer incorporated in a matrix of hardened oil or, when used for nitrile hydrogenation, in solid fatty nitrile or fatty amine.

Important parameters in developing these catalysts are the improvement of selectivity, of activity and of filterability. Generally the work on these subjects has been concentrated on the modification of either the characteristics of the catalyst itself or of the hydrogenation process parameters.

Especially in the edible oil industry some producers prefer to start the hydrogenation at relatively low temperature, that is at about 120° C., or even lower, thereby using the exotherm to heat the reactor to the desired final temperature. This saves energy input and increases the capacity as the cycle time is shortened. In order to be able to decrease the starting temperature, it is of course important that the catalyst has sufficient activity at this low temperature. It has been found that the conventional catalysts do not give sufficient low temperature activity.

It is an object of the present invention to provide for a catalyst that is suitable for this purpose.

The present invention is based on the surprising fact that the low temperature activity of a catalyst is influenced by the shape and size of the actual product used in the hydrogenation plant, that is the matrix of hardened oil (fat) or derivative thereof, in which the catalyst itself is incorporated.

The present invention is accordingly directed to hydrogenation matrix catalyst matrix particles based on nickel or cobalt and a support, incorporated in a matrix of hardened oil or a derivative thereof, which matrix material is solid at a temperature of 25° C., said matrix particles having an average weight of at least 120 mg and an average height of at least 2.8 mm.

The average weight of the catalyst matrix particles can easily be determined from a representative sample of a production batch of the catalyst matrix particles using appropriate sampling techniques (for example an amount of sample of at least 10 g), simply by determining the weight of a known number of particles and dividing the total weight by the number of particles. The average height is determined by averaging the height of the matrix particles from the same sample. This height is defined as the smallest size of the particle. In case hemispherical particles are used, the height is the distance between the flat underside and the top of the particle. In case more or less spherical particles are used the size is simply the diameter (or smallest diameter) of the particle. In case of flakes the size is the smallest distance between two opposite surfaces of the flake.

Conventional catalyst particles did not possess the presently defined combination of features, as they had either an average weight or an average height below the required value. A number of catalysts are known having an average height of about 2.4 to 2.8 mm, in many cases in combination with an average weight of between 60 and 100 mg. One catalyst had an average weight of about 150 mg, but this catalyst did not have the required height, namely only about 2.6 mm. None of those prior art catalysts possess the very good low temperature properties of the catalysts according to the invention.

The matrix particles of the present invention have an average height of at least 2.8 mm, preferably at least 2.9 mm, more in particular at least 3.0 mm. The upper limit is not very critical, as the object of the invention is reached when meeting the lower limit. For practical purposes the upper limit will not be more than 12 mm, as it is rather difficult to prepare and to use matrix particles that have a height above this value.

The average weight of the matrix particles of the present invention is at least 120 mg. According to preferred embodiments the weight is more than 130 mg, more in particular more than 140 mg, as above those limits the optimal results are obtained. Again the upper limit is not very critical, as it is mainly determined by the limits put upon the matrix particles by production and use. Generally the upper limit is about 500 mg, preferably 300 mg.

The particles of the present invention can be prepared in a number of manners, but preferably by preparing a suspension of the supported nickel or cobalt catalyst powder (elementary catalyst particles), typically having a size in the range of 1 to 100 pm, in a melt of the hardened oil or a derivative thereof, and letting droplets of the said suspension fall on a cooled plate, resulting in solid matrix particles having an essentially hemispherical shape.

Other methods of producing the catalyst matrix particles are i.a. letting droplets of the suspension fall into a cooled fluid, where they solidify to more or less spherical matrix particles (prilling in air or liquid), or flaking the suspension to flakes of a suitable thickness.

When using hemispherical particles the surface to volume ratio is less than 1.75 mm$^{-1}$, preferably between 0.5 and 1.75 mm$^{-1}$.

The matrix material of the particles can be a hardened oil or derivative thereof. Examples thereof are hardened vegetable, or less preferred animal, oils, as well as the solid derivatives thereof, such as fatty nitrites and fatty (primary, secondary and tertiary) amines.

The catalyst content in the matrix particles can range between wide limits. Generally it will not be more than 35 wt. % of nickel or cobalt, based on the weight of the particles. A preferred upper limit is about 30 wt. %, whereas the lower limit will be determined by economical considerations, resulting in a value of at least 5 wt. %, preferably at least 10, more in particular at least 15 wt. %.

The invention is directed generally to those catalysts that are used for the hydrogenation of (animal or vegetable) oils, free fatty acids and/or nitriles. All suitable supported nickel or cobalt catalysts can be used in the matrix particles. The catalysts described in the cited references, the contents of which references is incorporated herein by way of reference, can for example be used in the matrix particles. Other catalysts that can be included in a matrix of hardened oil (fat) or derivative thereof, may also be used.

The actual composition of the elementary catalyst particles is not very critical, although it is preferred to have a nickel or cobalt content between 5 and 95 wt. %, preferably between 15 and 75 wt. %. The size of the nickel crystallites may vary between 1 and 15 nm, and the nickel surface area can be between 5 and 250 $m^2/g$ of nickel.

As a support the conventional supports can be used such as the oxidic supports. Examples are silica, alumina and silica-alumina. The BET surface area of the elementary catalyst particles may be between 75 and 450 $m^2/g$, determined according to R. Haul and G. Dümbgen (Chem.Ing.Techn.;35, 586, (1963)).

Values outside those ranges can also be used, although they are not preferred.

The determination of the various parameters can be done using conventional techniques. The nickel crystallite size may be determined from the line broadening in the X-ray diffraction pattern. The nickel surface area may be determined by $H_2$-chemisorption, using the assumption that one nickel atom occupies 6.5 $Å^2$ (Ref.: Yates et al, JACS 86, pp. 2996–3001, 1964).

The catalyst may be promoted with various promotors. Some of these are disclosed in the cited references. Important promotors include magnesium, copper, iron and sulphur, which may be used in varying amounts, such as between 0.1 and 15 wt. %, calculated on the weight of the nickel or cobalt.

The material to be hydrogenated using the matrix particles of the invention includes the materials discussed in the introductory part, which include oils, both of animal and vegetable nature, and derivatives thereof, based on $C_{12}$ to $C_{22}$ triglycerides, for example the $C_{12}$ to $C_{22}$ fatty acids and nitrites.

The invention is elucidated on the basis of the following examples, without being limited thereto.

EXAMPLE 1 and 2

Two lots of catalyst particles were tested for their activity in the hydrogenation of soy bean oil, having a iodine value of 131.6. One lot had an average weight of 40 mg and an average height of 1.7 mm (Example 1). The second lot had an average weight of 175 mg and an average height of 3.1 mm (Example 2). Prior to the use thereof all lots of catalyst particles were stored for two weeks at 30° C. in air, in order to eliminate the influence of different storage conditions.

Using a catalyst concentration of 0.01 wt. % of nickel, soy bean oil was hydrogenated at 120° C. for 60 minutes at a hydrogen pressure of 0.70 bar. The results of the experiments were that the catalyst of Example 1 resulted in a decrease of the iodine value of 15.1, whereas the catalyst of example 2 gave a decrease of 21.2.

This clearly shows that the size of the actual particles has a profound influence on the activity in this experiment.

What is claimed is:

1. Matrix particles for hydrogenation, comprising a hardened oil or a derivative thereof and having incorporated therein, elementary hydrogenation catalyst particles of supported nickel or cobalt of about 1–100 μm in size, wherein said matrix particles are solid at a temperature of 25° C. and have an average weight of at least 120 mg and an average height of at least 2.8 mm.

2. Matrix particles according to claim 1 wherein said matrix particles have an average weight of at least 130 mg.

3. Matrix particles according to claim 1, wherein said average height of said matrix particles is at least 2.9 mm.

4. Matrix particles according to claim 1 wherein said matrix particles have an average weight between 120 mg and 130 mg.

5. Matrix particles according to claim 1 wherein said matrix particles have an average height between 2.8 mm and 12 mm.

6. Matrix particles according to claim 1, wherein said matrix particles have a surface to volume ratio between 0.5 and 1.75 mm.

7. A process for the hydrogenation of animal or vegetable oil, which process comprises:
  (a) providing an animal or vegetable oil to be hydrogenated;
  (b) mixing the animal or vegetable oil provided in step (a) with matrix particles according to claim 1, in a suitable container;
  (c) treating the mixture provided in step (b) with hydrogen at a pressure of about 0.7 bar. at about 120° C. for sufficient time to obtain the desired hydrogenated animal or vegetable oil; and
  (d) separating and recovering the desired hydrogenated animal or vegetable oil from the mixture in step (c).

8. A process for the hydrogenation of a fatty nitrile to produce a fatty amine, which process comprises:
  (a) providing a fatty nitrile to be hydrogenated;
  (b) mixing the animal or vegetable oil provided in step (a) with matrix particles according to claim 1, in a suitable container;
  (c) treating the mixture provided in step (b) with hydrogen at a pressure of about 0.7 bar. at about 120° C. for sufficient time to obtain the desired hydrogenated animal or vegetable oil; and
  (d) separating and recovering the desired hydrogenated animal or vegetable oil from the mixture in step (c).

9. Matrix particles according to claim 1, 2, 3, 4, 5, or 6, wherein the catalyst is a supported nickel catalyst.

10. Matrix particles according to claim 1, 2, 3, 4, 5, or 6, wherein the amount of nickel in said matrix particles, calculated on the basis of the combined weight of catalyst and matrix, does not exceed 35 wt. %.

11. Matrix particles according to claim 1, 2, 3, 4, 5, or 6, wherein the nickel or cobalt content is between 5 and 95%, based on the combined weight of the support and the nickel or cobalt.

12. Matrix particles according to claim 1, 2, 3, 4, 5, or 6, wherein said matrix particles have an essentially hemispherical shape.

* * * * *

UNITED STATES PATENT AND TRADEMARK OFFICE
CERTIFICATE OF CORRECTION

PATENT NO.    : 6,281,163 B1
DATED         : August 28, 2001
INVENTOR(S)   : Gustaaf J.M. Van Dijk It is certified that error appears in the above-identified patent and that said Letters Patent is hereby corrected as shown below:

<u>Title page,</u>
Item [73], Assignee, "de Meern" should read -- De Meern --;

<u>Column 1,</u>
Line 58, "matrix catalyst matrix particles" should read -- catalyst matrix particles --;

<u>Column 2,</u>
Line 42, "pm," should read -- $\mu$m, --;
Line 57, "nitrites" should read -- nitriles --; and <u>Column 3,</u>
Line 40, "nitrites." should read -- nitriles. --.

Signed and Sealed this

Third Day of September, 2002

Attest:

JAMES E. ROGAN
*Attesting Officer*     *Director of the United States Patent and Trademark Office*